United States Patent
Mouridsen

(10) Patent No.: US 10,439,512 B1
(45) Date of Patent: Oct. 8, 2019

(54) CLAMP CIRCUIT TO REDUCE OVERSHOOT IN POWER CONVERTERS

(71) Applicant: SCHNEIDER ELECTRIC IT CORPORATION, West Kingston, RI (US)

(72) Inventor: Jonas Sonsby Mouridsen, Odense V (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 16/143,900

(22) Filed: Sep. 27, 2018

(51) Int. Cl.
  *H02M 5/458*  (2006.01)
  *H02M 7/487*  (2007.01)
  *H02M 1/42*  (2007.01)
  *H02J 9/06*  (2006.01)

(52) U.S. Cl.
  CPC .............. *H02M 7/487* (2013.01); *H02J 9/062* (2013.01); *H02M 1/4216* (2013.01); *H02M 5/458* (2013.01); *H02M 5/4585* (2013.01); *H02J 2009/063* (2013.01)

(58) Field of Classification Search
  CPC ....... H02M 2001/0058; H02M 1/4216; H02M 5/458; H02M 5/4585; H02M 7/487; H02M 1/34; H02M 1/32; H02M 2001/346; H02M 2001/348
  See application file for complete search history.

(56) References Cited

U.S. PATENT DOCUMENTS

| | | | | |
|---|---|---|---|---|
| 4,783,728 A | * | 11/1988 | Hoffman | H02J 9/062 307/82 |
| 9,979,313 B2 | | 5/2018 | Mouridsen | |
| 2008/0291708 A1 | * | 11/2008 | Teichmann | H02M 1/32 363/50 |
| 2011/0127837 A1 | * | 6/2011 | Sato | H02J 9/062 307/66 |
| 2015/0194902 A1 | * | 7/2015 | Tian | H02M 5/458 363/37 |
| 2017/0005562 A1 | * | 1/2017 | Agirman | B66B 1/302 |

* cited by examiner

*Primary Examiner* — Yusef A Ahmed
*Assistant Examiner* — Ishrat F Jamali
(74) *Attorney, Agent, or Firm* — Lando & Anastasi, LLP

(57) ABSTRACT

According to one aspect, embodiments of the invention provide a power supply system comprising an input, an output, a neutral point, a converter configured to convert input AC power into converted DC power, the converter including a first converter switch, a positive DC bus configured to receive the converted DC power, a negative DC bus configured to receive the converted DC power, an inverter configured to convert DC power from the positive and negative DC busses into output AC power, the inverter including a first inverter switch, and a clamp circuit coupled to the positive DC bus and coupled across at least one of the first converter switch and the first inverter switch, the clamp circuit configured, during switching operation, to clamp a voltage across the first converter switch and/or the first inverter switch to a voltage level of the positive DC bus or the negative DC bus.

20 Claims, 4 Drawing Sheets

CLAMP CIRCUIT TO REDUCE OVERSHOOT IN POWER CONVERTERS

BACKGROUND

1. Field of the Disclosure

The present invention relates generally to systems and methods for controlling an uninterruptible power supply (UPS).

2. Description of Background

A power supply, such as an uninterruptible power supply (UPS) is typically used to provide power to an electrical device or load. A UPS can provide power while a primary power source, or mains, is unavailable. A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged.

SUMMARY

At least some aspects and embodiments of the invention are directed toward a power supply system comprising an input configured to receive input AC power from an input power source, the input AC power including an input sinusoidal waveform, an output configured to provide output AC power to a load, the output AC power including an output sinusoidal waveform, a neutral point, a converter coupled to the input and configured to convert the input AC power into converted DC power, the converter including a first converter switch coupled between the input and the neutral point, a positive DC bus configured to receive the converted DC power, a negative DC bus configured to receive the converted DC power, an inverter coupled to the output and configured to convert DC power from the positive and negative DC busses into the output AC power, the inverter including a first inverter switch coupled between the neutral point and the output, and a clamp circuit coupled to the positive DC bus and coupled across at least one of the first converter switch and the first inverter switch, the clamp circuit configured, during switching operation, to clamp a voltage across the at least one of the first converter switch and the first inverter switch to a voltage level of the positive DC bus or the negative DC bus.

According to one embodiment, the clamp circuit comprises at least one switching loop coupled across the at least one of the first converter switch and the first inverter switch and configured to clamp the voltage across the at least one of the first converter switch and the first inverter switch to the voltage level of the positive DC bus or the negative DC bus during switching operation of the at least one of the first converter switch and the first inverter switch. In one embodiment, the at least one switching loop comprises a first switching loop including a first clamp diode, and a clamp capacitor coupled to the first clamp diode.

According to another embodiment, the first converter switch is coupled to the input, the clamp circuit is coupled across the first converter switch, and the first clamp diode is coupled between the input and the clamp capacitor, and wherein during a positive half cycle of the input sinusoidal waveform and during turn-off of the first converter switch, current from the input is provided to the clamp capacitor via the first clamp diode to charge the clamp capacitor such that a voltage level across the clamp capacitor is at least equal to the voltage level of the positive DC bus. In one embodiment, the at least one switching loop comprises a second switching loop including a second clamp diode and the clamp capacitor. In one embodiment, a length of at least one of the first switching loop and the second switching loop is about 3 cm.

According to one embodiment, the converter includes a second converter switch coupled between the first converter switch and the neutral point, the clamp circuit is coupled across the second converter switch, and the second clamp diode is coupled between the clamp capacitor and the neutral point, and wherein during a negative half cycle of the input sinusoidal waveform and during turn-off of the second converter switch, current from the neutral point is provided to the clamp capacitor via the second clamp diode to charge the clamp capacitor such that the voltage level across the clamp capacitor is at least equal to the voltage level of the negative DC bus.

According to another embodiment, the clamp circuit further comprises a third clamp diode coupled to the clamp capacitor, and a clamp resistor coupled between the third clamp diode and the positive DC bus, wherein during turn-on of the first converter switch or the second converter switch, current from the clamp capacitor is discharged to the positive DC bus via the third clamp diode and the clamp resistor.

According to one embodiment, the first inverter switch is coupled to the output, the clamp circuit is coupled across the first inverter switch, and the first clamp diode is coupled between the output and the clamp capacitor, and wherein during a positive half cycle of the output sinusoidal waveform and during turn-off of the first inverter switch, current from the output is provided to the clamp capacitor via the first clamp diode to charge the clamp capacitor such that a voltage level across the clamp capacitor is at least equal to the voltage level of the positive DC bus.

According to another embodiment, the at least one switching loop comprises a second switching loop including a second clamp diode, and the clamp capacitor is further coupled to the second clamp diode. In one embodiment, the inverter further comprises a second inverter switch coupled between the first inverter switch and the neutral point, the clamp circuit is coupled across the second inverter switch, and the second clamp diode is coupled between the clamp capacitor and the neutral point, and wherein during a negative half cycle of the output sinusoidal waveform and during turn-off of the second converter switch, current from the neutral point is provided to the clamp capacitor via the second clamp diode to charge the clamp capacitor such that a voltage level across the clamp capacitor is at least equal to the voltage level of the negative DC bus. In one embodiment, a length of at least one of the first switching loop and the second switching loop is about 3 cm.

According to one embodiment, the clamp circuit further comprises a third clamp diode coupled to the clamp capacitor, and a clamp resistor coupled between the third clamp diode and the positive DC bus, wherein during turn-on of the first inverter switch or the second inverter switch, current from the clamp capacitor is discharged to the positive DC bus via the third clamp diode and the clamp resistor.

According to another embodiment, the power supply system further comprises a controller coupled to the inverter, wherein the inverter further includes a third inverter switch coupled to the output and configured to provide AC power to the output derived from the DC power of the positive and negative DC busses, and wherein upon initial turn-on of the inverter, the controller is configured to transmit a plurality of pulses to the third inverter switch to limit the current provided from the output to the clamp capacitor via the first clamp diode.

Another aspect of the invention is directed toward a method for operating a power supply system, the power supply system comprising an input, an output, a neutral point, a converter coupled to the input and including a first converter switch coupled between the input and the neutral point, a positive DC bus coupled to the converter, a negative DC bus coupled to the converter, and an inverter coupled to the output and including a first inverter switch coupled between the neutral point and the output, the method comprising receiving, at the input, input AC power from a power source, the input AC power including an input sinusoidal waveform, converting, with the converter, the input AC power into converted DC power, providing the converted DC power to the positive and negative DC busses, converting, with the inverter, DC power from the positive and negative DC busses into output AC power, providing the output AC power to the output, and during switching operation of at least one of the first converter switch and the first inverter switch, clamping a voltage across the at least one of the first converter switch and the first inverter switch to a voltage level of the positive DC bus or the negative DC bus.

According to one embodiment, the first converter switch is coupled to the input and the converter further includes a second converter switch coupled between the first converter switch and the neutral point, wherein clamping the voltage includes, during a positive half cycle of the input sinusoidal waveform and during turn-off of the first converter switch, providing current from the input to a clamp capacitor via a first switching loop to charge the clamp capacitor such that a voltage level across the clamp capacitor is at least equal to the voltage level of the positive DC bus, and wherein clamping the voltage further includes, during a negative half cycle of the input sinusoidal waveform and during turn-off of the second converter switch, providing current from the neutral point to the clamp capacitor via a second switching loop to charge the clamp capacitor such that the voltage level across the clamp capacitor is at least equal to the voltage level of the negative DC bus. In one embodiment, the method further comprises, during turn-on of the first converter switch or the second converter switch, discharging the clamp capacitor to the positive DC bus.

According to another embodiment, the first inverter switch is coupled to the output and the inverter further includes a second inverter switch coupled between the first inverter switch and the neutral point, wherein clamping the voltage includes, during a positive half cycle of the output sinusoidal waveform and during turn-off of the first inverter switch, providing current from the output to the clamp capacitor via a first switching loop to charge the clamp capacitor such that a voltage level across the clamp capacitor is at least equal to the voltage level of the positive DC bus, and wherein clamping the voltage further includes, during a negative half cycle of the output sinusoidal waveform and during turn-off of the second inverter switch, providing current from the neutral point to the clamp capacitor via a second switching loop to charge the clamp capacitor such that a voltage level across the clamp capacitor is at least equal to the voltage level of the negative DC bus. In one embodiment, the method further comprises, upon initial-turn on of the inverter, transmitting a plurality of gate pulses to the inverter to limit the current provided from the output to the clamp capacitor via the first switching loop.

At least one aspect of the invention is directed to a power supply system comprising an input configured to receive input AC power from an input power source, the input AC power including an input sinusoidal waveform, an output configured to provide output AC power to a load, the output AC power including an output sinusoidal waveform, a neutral point, a converter coupled to the input and configured to convert the input AC power into converted DC power, the converter including a converter switch coupled between the input and the neutral point, a positive DC bus configured to receive the converted DC power, a negative DC bus configured to receive the converted DC power, an inverter coupled to the output and configured to convert DC power from the positive and negative DC busses into the output AC power, the inverter including an inverter switch coupled between the neutral point and the output, and means for reducing voltage overshoot across at least one of the converter switch and the inverter switch by clamping a voltage across the at least one of the converter switch and the inverter switch to a voltage level of the positive DC bus or the negative DC bus during switching operation of the at least one of the converter switch and the inverter switch.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
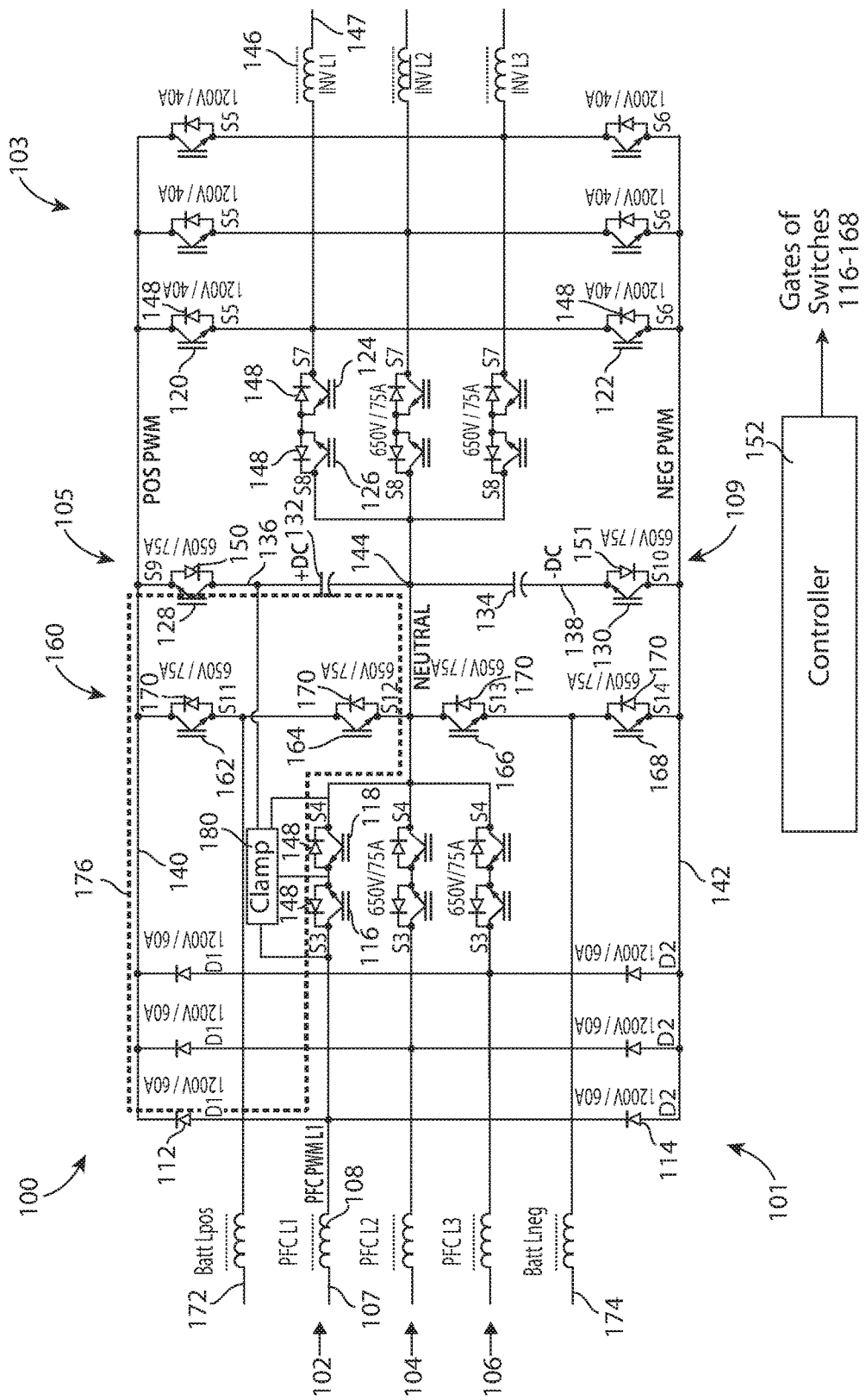
FIG. 1 is a schematic diagram of a 3 phase, 3-level UPS topology according to aspects of the present disclosure.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, UPS systems are commonly used to provide power to loads. In power converters, such as Power Factor Correction (PFC) converters or inverters found in UPS systems, it is oftentimes desirable to limit voltage overshoot during semiconductor switching to within acceptable levels (i.e., within component specifications). Voltage overshoot can be caused by parasitic effects such as stray inductance in a Printed Circuit Board (PCB) and/or components. Voltage overshoot can also be caused by forward recovery time and reverse recovery effects of diodes.

Some traditional approaches for reducing voltage overshoot include reducing the switching speed of the converter's semiconductors, reducing the DC-bus voltage in the converter, or utilizing components in the converter with a higher voltage rating/reduced forward recovery time. However, such methods may result in disadvantages such as higher losses, higher cost, and/or may not be feasible due to design constraints. Another conventional approach to minimize overshoot is to utilize clamp diodes which are coupled to the DC-bus or local DC-bus decoupling capacitors of the converter and configured to conduct the overshoot. However, this typically requires two additional diodes, per phase, plus two additional decoupling capacitors placed close to the switching semiconductors. In addition, the forward voltage of the clamp diode must be relatively high, otherwise the clamp diode will conduct too much current. The cost and complexity of such a solution is high when compared to the potential improvement in overshoot.

In some embodiments, a clamp circuit is provided which can be located relatively close to a switching semiconductor in a converter. By being placed relatively close to a switching semiconductor, the clamp circuit can operate to form a relatively short switching loop that results in a reduction in stray inductance and thus a reduction in voltage overshoot.

FIG. 1 is a schematic diagram of a 3-level UPS 100 according to at least one embodiment described herein. The UPS 100 is a 3-phase UPS that includes three segments 102, 104, 106. Each segment 102, 104, 106 is configured to be coupled to one phase of a 3-phase power source. Each segment 102, 104, 106 is substantially the same and operates on its corresponding phase in substantially the same way. As such, the UPS 100 is discussed in greater detail below with regard to a first segment 102.

The UPS 100 includes a PFC converter 101, an inverter 103, a positive DC bus 136, a negative DC bus 138, a positive "floating" DC bus 140, a negative "floating" DC bus 142, a first DC switch circuit 105, a first capacitor 132, a second DC switch circuit 109, a second capacitor 134, a neutral point 144, a DC-DC converter 160, a clamp circuit 180, and a controller 152. The PFC converter 101 includes a first inductor 108, a first diode 112, a second diode 114, a first switch 116, and a second switch 118. The inverter 103 includes a third switch 120, a fourth switch 122, a fifth switch 124, a sixth switch 126, and a second inductor 146. The first DC switch circuit 105 includes a seventh switch 128 and an internal diode 150. The second DC switch circuit 109 includes an eighth switch 130 and an internal diode 151. The DC-DC converter 160 includes a ninth switch 162, a tenth switch 164, an eleventh switch 166, and a twelfth switch 168.

According to one embodiment, the third switch 120 and the fourth switch 122 are 1200V Insulated-Gate Bipolar Transistors (IGBT); however, in other embodiments, the IGBTs 120, 122 may be rated differently or different types of switches may be utilized. In one embodiment, the first switch 116, second switch 118, fifth switch 124, and sixth switch 126 are 650V IGBTs; however, in other embodiments, the IGBTs 116, 118, 124, 126 may be rated differently or different types of switches may be utilized. Each IGBT 112-126 also includes an internal diode 148 coupled between its collector and emitter. According to one embodiment, the seventh switch 128 and eighth switch 130 are 650V IGBTs; however, in other embodiments, the IGBTs 128, 130 may be rated differently or different types of switches may be utilized. According to one embodiment, the switches 162-168 are 650V IGBTs; however, in other embodiments, the IGBTs 162-168 may be rated differently or different types of switches may be utilized. Each switch 162-168 includes an internal diode 170 coupled between its collector and emitter. The internal diode 150 of the first DC switch circuit 105 is coupled between the collector and the emitter of the seventh switch 128. The internal diode 151 of the second DC switch circuit 109 is coupled between the collector and emitter of the eighth switch 130.

A first terminal of the first inductor 108 is coupled to an input 107 of the UPS 100. The input 107 is configured to be coupled to a 3-phase power source. A second terminal of the first inductor 108 is coupled to the anode of the first diode 112. The cathode of the first diode 112 is coupled to the positive "floating" DC bus 140. The collector of the third switch 120 is coupled to the positive "floating" DC bus 140. The emitter of the third switch 120 is coupled to a first terminal of the second inductor 146. A second terminal of the second inductor 146 is coupled to an output 147 of the UPS 100. The cathode of the second diode 114 is also coupled to the second terminal of the first inductor 108. The anode of the second diode 114 is coupled to the negative "floating" DC bus 142. The emitter of the fourth switch 122 is also coupled to the negative "floating" DC bus 142. The collector of the fourth switch 122 is also coupled to the first terminal of the second inductor 146.

The collector of the first switch 116 is also coupled to the second terminal of the first inductor 108. The emitter of the first switch 116 is coupled to the emitter of the second switch 118. The collector of the second switch 118 is coupled to the neutral point 144. The collector of the sixth switch 126 is coupled to the neutral point 144. The emitter of the sixth switch 126 is coupled to the emitter of the fifth switch 124. The collector of the fifth switch 124 is also coupled to the first terminal of the second inductor 146. The emitter of the seventh switch 128 is coupled to the positive "floating" DC bus 140. The collector of the seventh switch 128 is coupled to the positive DC bus 136. A first terminal of the first capacitor 132 is coupled to the positive DC bus 136 and a second terminal of the first capacitor 132 is coupled to the neutral point. A first terminal of the second capacitor 134 is coupled to the neutral point 144 and a second terminal of the second capacitor 134 is coupled to the negative DC bus 138. The emitter of the eighth switch 130 is also coupled to the negative DC bus 138. The collector of the eighth switch 130 is coupled to the negative "floating" DC bus 142.

The collector of the ninth switch 162 is coupled to the positive "floating" DC bus 140. The emitter of the ninth switch 162 is coupled to the collector of the tenth switch 164. The emitter of the tenth switch 164 is coupled to the neutral point 144. The collector of the eleventh switch 166 is also coupled to the neutral point 144. The emitter of the eleventh switch 166 is coupled to the collector of the twelfth switch 168. The emitter of the twelfth switch 168 is coupled to the negative "floating" DC bus 142. A positive DC-DC converter line 172 is coupled to the emitter of the ninth switch 162 and the collector of the tenth switch 164. The positive DC-DC converter line 172 is also configured to be coupled to a positive side of a battery. A negative DC-DC converter line 174 is coupled to the emitter of the eleventh switch 166 and the collector of the twelfth switch 168. The negative DC-DC converter line 174 is also configured to be coupled to a negative side of a battery. The controller 152 is coupled to the gate of each switch 112-130, 162-168 in the UPS 100. The clamp circuit 180 is coupled to the collector and emitter of the first switch 116, the collector and emitter of the second switch 118, and the positive DC bus 136.

Operation of the UPS 100 is described below with respect to the positive portion of the input phase line at the first segment 102. Similar operation also occurs on the negative portion of the input phase line at the first segment 102. One phase of the AC 3-phase power provided by the 3-phase power source is received by the input 107. The controller 152 operates the first switch 116, in conjunction with the first diode 112, to convert the one phase of the AC 3-phase power into converted DC power. The controller 152 also operates the first switch 116, in conjunction with the first diode 112, to provide power factor correction at the input 107. The converted DC power is provided to the "floating" DC bus 140. The third switch 120, of the inverter 103, is operated by the controller 152 to convert DC power from the positive "floating" DC bus 140 into regulated AC power. The regulated AC power is provided to the output 147.

Depending on the current at the output 147 of the UPS 100, the DC power provided to the inverter switch (i.e., the third switch 120) from the positive "floating" DC bus 140 may be derived from different portions of the UPS 100. For example, when the current at the output 147 of the UPS 100 is less than the current at the input 107 of the UPS 100, the DC power converted by the inverter switch (i.e., the third switch 120) is derived from the converted DC power provided by the PFC switch (i.e., the first switch 116) to the "floating" DC bus 140. In such an embodiment, a portion of the converted DC power on the "floating" DC bus 140 is also provided to the DC bus 136 via the diode 150 to charge the first capacitor 132. When the current at the output 147 of the UPS 100 is greater than the current at the input 107 of the UPS 100, the first capacitor 132 discharges and discharged DC power is provided from the DC bus 136 to the "floating" DC bus 140 via the seventh switch 128. DC power derived from both the PFC switch (i.e., the first switch 116) and the DC bus 136 is provided to the inverter switch (i.e., the third switch 120) for conversion into regulated AC power.

The controller 152 can also operate the switches 116-130 to provide ZVS when the PFC switch (i.e., the first switch 116) is turned on and when the inverter switch (i.e., the third switch 120) is turned off. The controller 152 synchronizes the PFC switch and the inverter switch so that the PFC switch (i.e., the first switch 116) turns on and the inverter switch (i.e., the third switch 120) turns off during a synchronized switching period. In one embodiment, during a synchronized switching period, the PFC switch is turned on and the inverter switch is turned off at substantially the same time. In another embodiment, during a synchronized switching period, the PFC switch may be turned on a relatively short time before the inverter switch is turned off.

According to one embodiment, the DC bus switch (i.e., the seventh switch 128) is generally kept on by the controller 152, but is turned off for a short duration around the synchronized switching period of the PFC and inverter switches. When the DC bus switch (i.e., the seventh switch 128) is turned off, voltage on the positive "floating" DC bus 140 will drop to zero (neutral) whenever the total positive inverter current is higher than total positive PFC converter current (i.e., when the seventh switch 128 provides power to the positive "floating" DC bus 140). This will allow the PFC switch (i.e., the first switch 116) to turn on having zero voltage across it (i.e., ZVS) and the inverter switch (i.e., the third switch 120) to turn off having zero voltage across it (i.e., ZVS).

In a battery mode of operation (e.g., when the AC power received from the power source is inadequate), the DC-DC converter 160 receives backup DC power from the battery, via the positive 172 and negative 174 DC-DC converter lines, and provides regulated DC power to the "floating" DC buses 140, 142. The controller 152 operates the switches 162-168 of the DC-DC converter 160 to provide desired DC power to the "floating" DC buses 140, 142. By coupling the DC-DC converter 160 to the "floating" DC buses 140, 142 having a zero voltage (i.e., when the DC switches 128, 130 are turned off), it is possible to obtain ZVS during boost switch (i.e., tenth switch 164 or eleventh switch 166) turn on in battery operation, as long as the total inverter current is greater than the DC-DC converter current for each DC bus at the synchronized switching point (e.g., at time 208). Similarly, ZVS can be obtained during turn-off of the ninth switch 162 or the twelfth switch 168 during a charge operation (i.e., during normal operation while the battery is being charged with charging power derived from the AC power source).

According to at least on embodiment, the UPS 100 can be further operated as described in U.S. patent application Ser. No. 15/320,622, titled "3-LEVEL POWER TOPOLOGY" and filed Jun. 27, 2014, which is incorporated by reference herein in its entirety. Furthermore, the system described herein may be applied in other UPS topologies or power systems.

As described above, voltage overshoot in power converters can be caused by parasitic effects such as stray inductance in a Printed Circuit Board (PCB) and/or components. For example, as shown in FIG. 1 by the dashed line 176, during IGBT turn off, a relatively large current loop can be formed (including the first switch 116, the second switch 118, the first diode 112, and the seventh switch 128 in series) due to physical layout constraints of the PCB of the UPS 100.

More specifically, in the positive half-period of the input power received at the input 107, the voltage (V IN) at the input 107 is positive, and current passes from the input 107 to the first switch 116, via the first inductor 108. When current needs to be boosted, the first switch 116 is turned on and a current path is generated from the input 107 to the neutral point 144, via the first switch 116 and the internal diode 148 of the second switch 118. The current through the first inductor 108 is thereby increasing. When the first switch 116 is turned off (e.g., after a given time), the current through the first inductor 108 will typically start to freewheel to the positive DC bus 136 via the first diode 112 and the internal diode 150 of the seventh switch 128. This current path can form a relatively large loop 176, resulting in stray inductance and voltage overshoot. As current increases through the first diode 112, the stray inductance in the loop 176 can result in a voltage increase above the DC-bus level.

Figure 2:
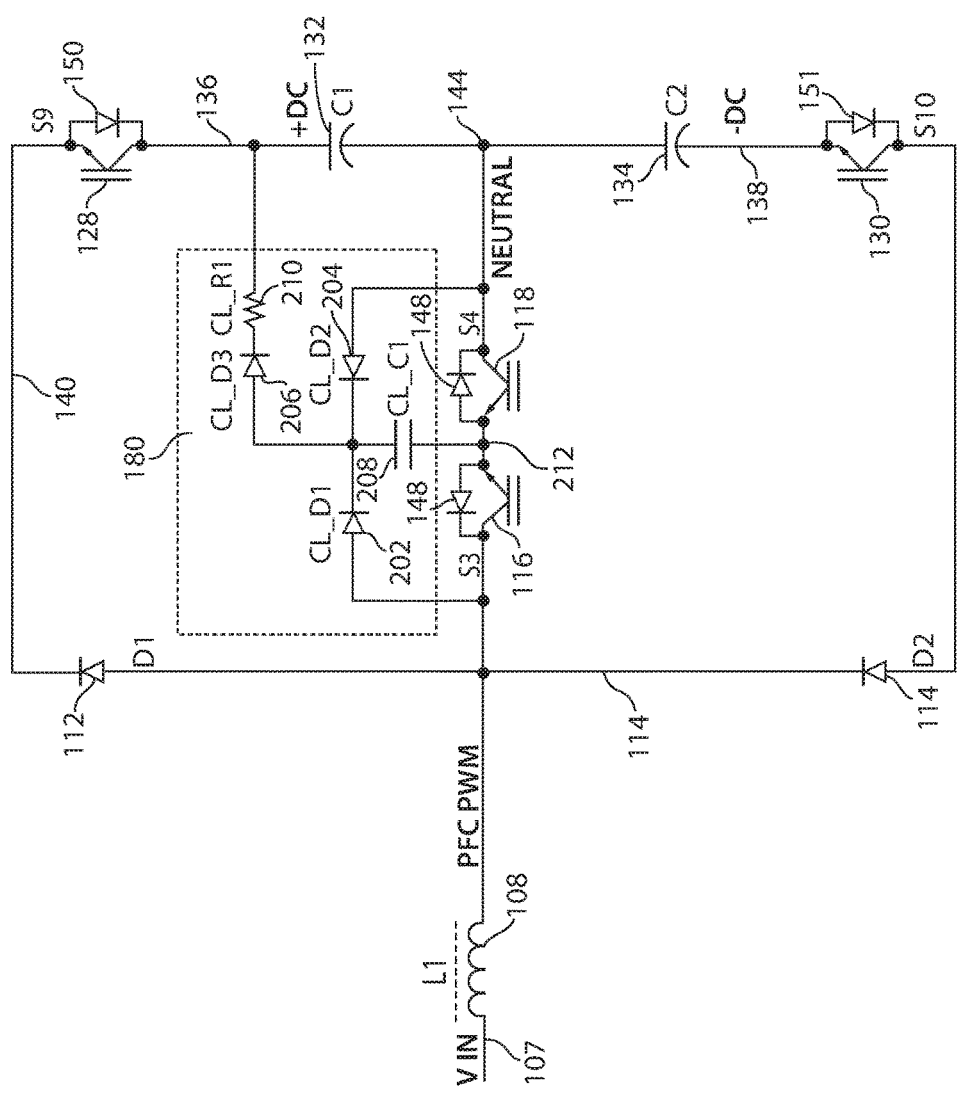
FIG. 2 is a schematic diagram including a clamp circuit coupled to a converter according to aspects of the present disclosure.

A clamp circuit (e.g., clamp circuit 180) is described herein that reduces the length of the current loop and thereby reduces the stray inductance in the PCB (and potential voltage overshoot). FIG. 2 is a more detailed schematic diagram including the clamp circuit 180 coupled to the PFC converter 101. The clamp circuit 180 includes a first diode (CL_D1) 202, a second diode (CL_D2) 204, a third diode (CL_D3) 206, a capacitor (CL_C1) 208, and a resistor (CL_R1) 210. The anode of the first clamp diode (CL_D1) 202 is coupled to the collector of the first switch 116. The anode of the second clamp diode (CL_D2) 204 is coupled to the collector of the second switch 118. The cathodes of the first clamp diode (CL_D1) 202 and the second clamp diode (CL_D2) 204 are both coupled to a first terminal of the capacitor (CL_C1) 208. A second terminal of the capacitor (CL_C1) 208 is coupled to both the emitter of the first switch 116 and the emitter of the second switch 118. The anode of the third clamp diode (CL_D3) 206 is also coupled to the first terminal of the capacitor (CL_C1) 208. The cathode of the third clamp diode (CL_D3) 206 is coupled to a first terminal of the resistor (CL_R1) 210. A second terminal of the resistor is coupled to the positive DC bus 136.

According to one embodiment, the first clamp diode (CL_D1) 202 and the second clamp diode (CL_D2) 204 are 650V diodes such as 650V/10A SiC diodes in a DPAK case. SiC diodes may be utilized as they typically have an effective forward recovery time of zero. However, in other embodiments, differently rated and/or different types of diodes can be utilized. According to one embodiment, the capacitor (CL_C1) 208 includes two 68 nF/630V ceramic capacitors that have a relatively small surface size and can be placed closed to the semiconductors of the UPS 100. However, in other embodiments, a differently rated and/or different type of capacitor can be utilized. Operation of the clamp circuit 180 is discussed in greater detail below.

Initially, when input voltage (V IN) is applied to the input 107 for the first time (i.e., before switching of the first switch 116 begins), the capacitor (CL_C1) 208 is charged to the V IN level through the first diode (CL_D1) 202. When PFC switching begins (i.e., the first switch 116 is operated by the controller 152 as described above), the first switch 116 is turned on to boost current through the first inductor 108, the first clamp diode (CL_D1) 202 is blocking, and the clamp circuit 180 is inactive. When the first switch 116 is turned off, the first clamp diode (CL_D1) 202 starts to conduct as soon as the voltage on the anode of the first clamp diode (CL_D1) 202 exceeds the voltage across the capacitor (CL_C1) 208. When the first clamp diode (CL_D1) 202 conducts, the capacitor (CL_C1) will be rapidly charged by the current through the first inductor 108.

Once the voltage across the capacitor (CL_C1) 208 is equal to (or slightly exceeds) the voltage on the positive DC bus 136, current starts to flow through the first diode 112 and the internal diode 150 of the seventh switch. Current through the first diode 112 continues to increase while current through the first clamp diode (CL_D1) 202 decreases. When all of the current through the inductor 108 is directed through the first diode 112 and the current through the first clamp diode (CL_D1) 202 goes to zero, the clamp circuit 180 is again inactive and the voltage across the capacitor (CL_C1) 208 remains slightly higher than the voltage on the positive DC bus 136. According to one embodiment, the first clamp diode (CL_D1) 202 conducts for less than 100 ns in each 41.6 µs switching cycle; however, in other embodiments, the first clamp diode (CL_D1) 202 can conduct for another appropriate amount of time.

The next time the first switch 116 is turned on, the voltage at a midpoint 212 between the emitter of the first switch 116 and the emitter of the second switch 118, which was previously slightly negative, goes to zero. Once this happens, the capacitor (CL_C1) 208 is discharged through the third clamp diode (CL_D3) 206 diode and resistor (CL_R1) 210. According to one embodiment, the time of this discharge is selected to be around 1 µs so that the capacitor (CL_C1) 208 is discharged fast enough to be ready for the next switch cycle. However, in other embodiments, this time of discharge can be set to a different appropriate value.

The next time the first switch 116 turns off, the voltage across the first switch 116 will again effectively be clamped by the clamp circuit 180 due to the relatively small loop formed by the first switch 116, the first clamp diode (CL_D1) 202, and the capacitor (CL_C1) 208 (e.g., as described above). The small loop has a relatively low stray inductance which will result in reduced voltage overshoot. In at least one embodiment, by utilizing the clamp circuit 180, voltage overshoot in a converter can be reduced from around 200V to around 90V; however, in other embodiments, the voltage overshoot may be configured to another appropriate level.

During the negative half-period, the functionality of the clamp circuit 180 will be generally the same, except that it will be the second switch 118 that is switching, and the second clamp diode (CL_D2) 204 diode that will be clamping. For example, once the second switch 118 turns off, the voltage at the first switch 116/second switch 118 midpoint 212 will drop to the level of the negative DC bus 138. Once the voltage of the midpoint 212 drops below the voltage level across the capacitor (CL_C1) 208, the second clamp diode (CL_D2) 204 will start to conduct.

Figure 3:
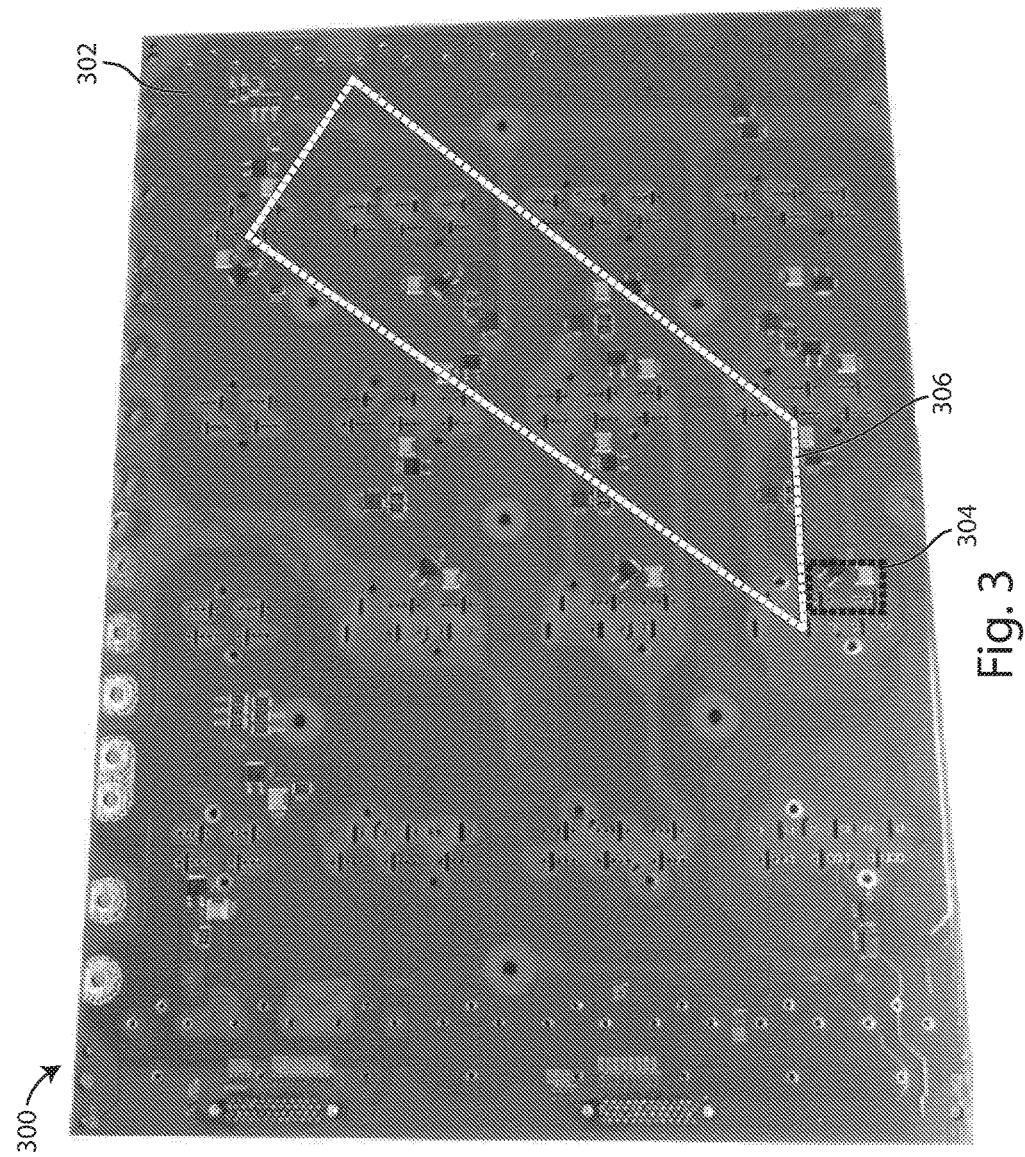
FIG. 3 is an illustration of a printed circuit board according to aspects of the present disclosure.

As described above, the clamp circuit 180 can be located relatively close to a switching semiconductor (e.g., the first switch 116 and the second switch 118) in a converter. By being placed relatively close to a switching semiconductor, the clamp circuit 180 can operate to form a relatively short switching loop that results in a reduction in stray inductance and thus a reduction in voltage overshoot. For example, FIG. 3 shows the underside 302 of a PCB 300 on which portions of a UPS (e.g., the UPS 100 described above) can be implemented. The top side of the PCB 300 includes the semiconductors of the UPS (for example, the IGBTs of UPS 100 described above). The clamp circuit 180 is located on the underside 302 of the PCB 300 and provides a short switching loop (shown by a first dashed line 304) when a corresponding IGBT switch turns off (e.g., as described above). According to one embodiment, the length of the short loop 304 is about 3 cm; however, in other embodiments, the length of the short loop may be configured differently. The length of the short loop is shorter than the length of a conventional switching loop which is traditionally generated upon IGBT turn off, absent the clamp circuit 180 (e.g., shown by a second dashed line 306). The conventional switching loop commonly has a length of about 50 cm.

Figure 4:
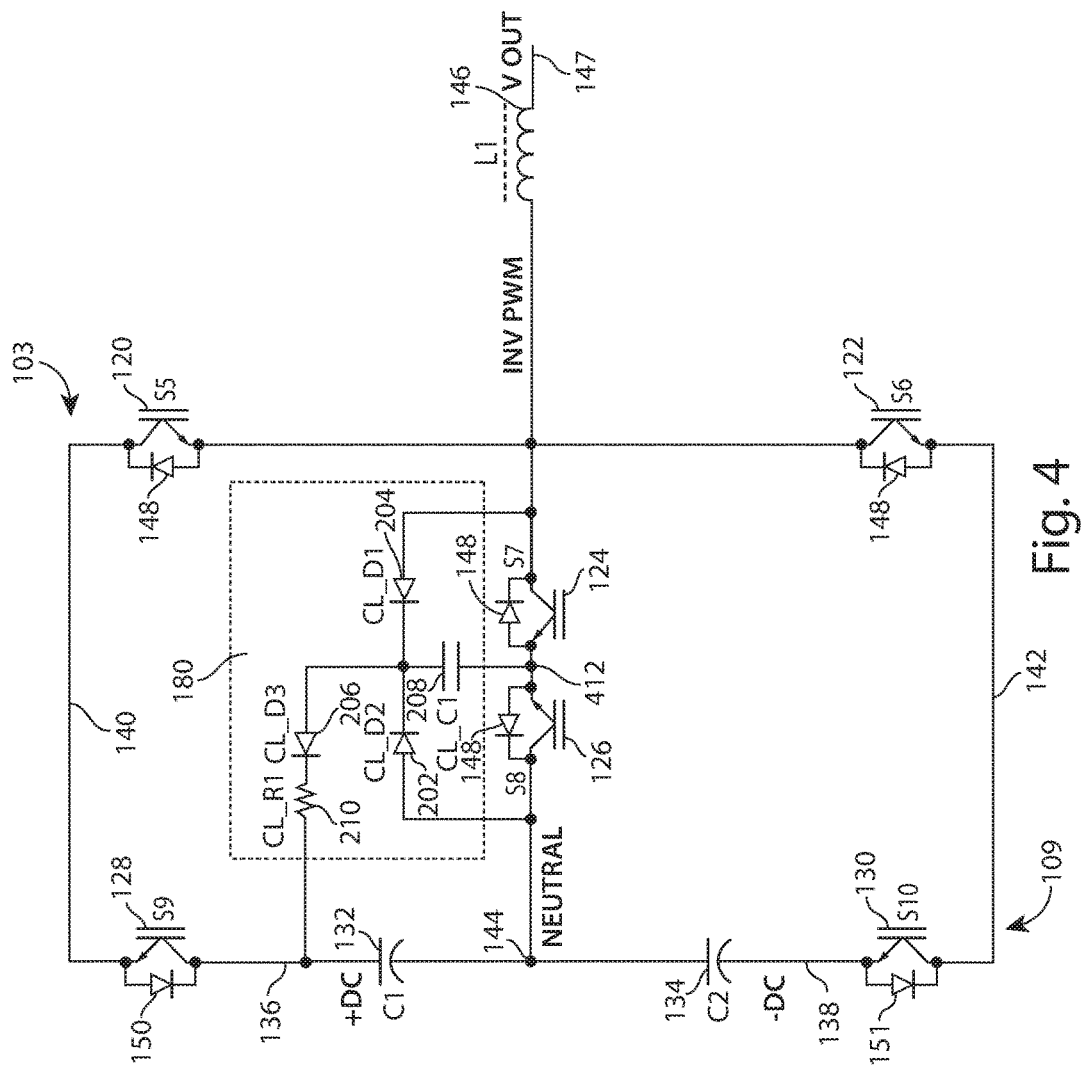
FIG. 4 is a schematic diagram including a clamp circuit coupled to an inverter according to aspects of the present disclosure.

The clamp circuit 180 described above can also be coupled to the inverter 103 of the UPS 100. FIG. 4 is a detailed schematic diagram including the clamp circuit 180 coupled to the inverter 103. As shown in FIG. 4, the anode of the first clamp diode (CL_D1) 202 is coupled to neutral 144. The anode of the second clamp diode (CL_D2) 204 is coupled to the first terminal of the second inductor 146. The cathodes of the first clamp diode (CL_D1) 202 and the second clamp diode (CL_D2) 204 are both coupled to a first terminal of the capacitor (CL_C1) 208. A second terminal of the capacitor (CL_C1) 208 is coupled to both the emitter of the fifth switch 124 and the emitter of the sixth switch 126. The anode of the third clamp diode (CL_D3) 206 is also coupled to the first terminal of the capacitor (CL_C1) 208. The cathode of the third clamp diode (CL_D3) 206 is coupled to a first terminal of the resistor (CL_R1) 210. A second terminal of the resistor is coupled to the positive DC bus 136.

According to at least one embodiment, the clamp circuit 180 can also be utilized in an inverter application (e.g., as shown in FIG. 4) to reduce voltage overshoot during turn-on of the third switch 120/fourth switch 122. When the clamp circuit 180 is utilized in an inverter application, rather than a PFC converter application, the general functionality of the clamp circuit 180 is the same except that a specific startup sequence can be utilized to avoid potential inrush current issues when the corresponding inverter is turned on. For example, according to at least one embodiment, the capacitor (CL_C1) 208 is initially completely discharged (before the inverter 103 is turned on). Once the inverter 103 is turned on (e.g., by the controller 152), either the third switch 120 or the fourth switch 122 will be turned on to boost the output current through the second inductor 146. When, for example, the third switch 120 is turned on for the first time, the result can be a large peak current provided to the capacitor (CL_C1) 208, via the third switch 120 and the first clamp diode (CL_D1) 204, to charge the capacitor (CL_C1) 208. Since the inductance generated by the resulting loop (i.e., created by the third switch 120, the first clamp diode (CL_D1) 204, the capacitor (CL_C1) 208, and the internal diode 148 of the sixth switch 126) is relatively small, the resulting peak current through the loop can be very large (e.g., greater than 600A).

As such, according to at least on embodiment, the clamp circuit 180 is operated by the controller 152 to avoid such a large peak current upon inverter 103 turn on. For example, in one embodiment, the third switch 120/fourth switch 122 is turned on, by the controller 152, with narrow (e.g., 200 ns) gate pulses, thus driving the third switch 120/fourth switch 122 out of saturation and slowly charging the capacitor (CL_C1) 208 with a limited current. According to at least on embodiment, the controller 152 transmits five narrow gate pulses to the third switch 120/fourth switch 122; however, in other embodiments, the controller 152 may send any number of narrow pulses to the third switch 120/fourth switch 122 upon starting up the inverter 103. After the initial narrow startup pulses, the capacitor (CL_C1) 208 is sufficiently charged and the clamp circuit 180 can operate normally (e.g., as similarly described above).

As discussed above, the controller 152 is configured to monitor and control operation of the UPS 100. Using data stored in associated memory, the controller 152 is operable to execute one or more instructions that may result in the manipulation of one or more switches' conductive states. In some examples, the controller 152 can include one or more processors or other types of controllers. The controller 152 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

According to at least one embodiment, the clamp circuit described herein can be utilized with the converter shown in FIG. 2; however, in other embodiments, the clamp circuit can be utilized in other types of converters/inverters/UPS systems/power systems. For example, in one embodiment, the clamp circuit can be utilized in an NPC-2 (T-type) converter, traditionally used in UPS systems and solar inverters, which omits the seventh switch 128 and the eighth switch 130. In another embodiment, the clamp circuit can be utilized with a converter similar to the one shown in FIG. 2, except that the DC-DC converter 160 is removed.

As described above, a clamp circuit is provided which can be located relatively close to a switching semiconductor in a converter. By being placed relatively close to a switching semiconductor, the clamp circuit can operate to form a relatively short switching loop that results in a reduction in stray inductance and thus a reduction in voltage overshoot.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A power supply system comprising:
    an input configured to receive input AC power from an input power source, the input AC power including an input sinusoidal waveform;
    an output configured to provide output AC power to a load, the output AC power including an output sinusoidal waveform;
    a neutral point;
    a converter coupled to the input and configured to convert the input AC power into converted DC power, the converter including a first converter switch coupled between the input and the neutral point;
    a positive DC bus configured to receive the converted DC power;
    a negative DC bus configured to receive the converted DC power;
    an inverter coupled to the output and configured to convert DC power from the positive and negative DC busses into the output AC power, the inverter including a first inverter switch coupled between the neutral point and the output; and
    a clamp circuit coupled to the positive DC bus and coupled across at least one of the first converter switch and the first inverter switch, the clamp circuit configured, during switching operation, to clamp a voltage across the at least one of the first converter switch and the first inverter switch to a voltage level of the positive DC bus or the negative DC bus.

2. The power supply system of claim 1, wherein the clamp circuit comprises at least one switching loop coupled across the at least one of the first converter switch and the first inverter switch and configured to clamp the voltage across the at least one of the first converter switch and the first inverter switch to the voltage level of the positive DC bus or the negative DC bus during switching operation of the at least one of the first converter switch and the first inverter switch.

3. The power supply system of claim 2, wherein the at least one switching loop comprises a first switching loop including:
a first clamp diode; and
a clamp capacitor coupled to the first clamp diode.

4. The power supply system of claim 3, wherein the first converter switch is coupled to the input, the clamp circuit is coupled across the first converter switch, and the first clamp diode is coupled between the input and the clamp capacitor, and
wherein during a positive half cycle of the input sinusoidal waveform and during turn-off of the first converter switch, current from the input is provided to the clamp capacitor via the first clamp diode to charge the clamp capacitor such that a voltage level across the clamp capacitor is at least equal to the voltage level of the positive DC bus.

5. The power supply system of claim 4, wherein the at least one switching loop comprises a second switching loop including a second clamp diode and the clamp capacitor.

6. The power supply system of claim 5, wherein the converter includes a second converter switch coupled between the first converter switch and the neutral point, the clamp circuit is coupled across the second converter switch, and the second clamp diode is coupled between the clamp capacitor and the neutral point, and
wherein during a negative half cycle of the input sinusoidal waveform and during turn-off of the second converter switch, current from the neutral point is provided to the clamp capacitor via the second clamp diode to charge the clamp capacitor such that the voltage level across the clamp capacitor is at least equal to the voltage level of the negative DC bus.

7. The power supply system of claim 6, wherein the clamp circuit further comprises:
a third clamp diode coupled to the clamp capacitor; and
a clamp resistor coupled between the third clamp diode and the positive DC bus,
wherein during turn-on of the first converter switch or the second converter switch, current from the clamp capacitor is discharged to the positive DC bus via the third clamp diode and the clamp resistor.

8. The power supply system of claim 5, wherein a length of at least one of the first switching loop and the second switching loop is about 3 cm.

9. The power supply system of claim 3, wherein the first inverter switch is coupled to the output, the clamp circuit is coupled across the first inverter switch, and the first clamp diode is coupled between the output and the clamp capacitor, and
wherein during a positive half cycle of the output sinusoidal waveform and during turn-off of the first inverter switch, current from the output is provided to the clamp capacitor via the first clamp diode to charge the clamp capacitor such that a voltage level across the clamp capacitor is at least equal to the voltage level of the positive DC bus.

10. The power supply system of claim 9, wherein the at least one switching loop comprises a second switching loop including a second clamp diode, and
wherein the clamp capacitor is further coupled to the second clamp diode.

11. The power supply system of claim 10, wherein the inverter further comprises a second inverter switch coupled between the first inverter switch and the neutral point, the clamp circuit is coupled across the second inverter switch, and the second clamp diode is coupled between the clamp capacitor and the neutral point, and
wherein during a negative half cycle of the output sinusoidal waveform and during turn-off of the second converter switch, current from the neutral point is provided to the clamp capacitor via the second clamp diode to charge the clamp capacitor such that a voltage level across the clamp capacitor is at least equal to the voltage level of the negative DC bus.

12. The power supply system of claim 11, wherein the clamp circuit further comprises:
a third clamp diode coupled to the clamp capacitor; and
a clamp resistor coupled between the third clamp diode and the positive DC bus,
wherein during turn-on of the first inverter switch or the second inverter switch, current from the clamp capacitor is discharged to the positive DC bus via the third clamp diode and the clamp resistor.

13. The power supply system of claim 11, further comprising a controller coupled to the inverter, wherein the inverter further includes a third inverter switch coupled to the output and configured to provide AC power to the output derived from the DC power of the positive and negative DC busses, and wherein upon initial turn-on of the inverter, the controller is configured to transmit a plurality of pulses to the third inverter switch to limit the current provided from the output to the clamp capacitor via the first clamp diode.

14. The power supply system of claim 10, wherein a length of at least one of the first switching loop and the second switching loop is about 3 cm.

15. A method for operating a power supply system, the power supply system comprising an input, an output, a neutral point, a converter coupled to the input and including a first converter switch coupled between the input and the neutral point, a positive DC bus coupled to the converter, a negative DC bus coupled to the converter, and an inverter coupled to the output and including a first inverter switch coupled between the neutral point and the output, the method comprising:
receiving, at the input, input AC power from a power source, the input AC power including an input sinusoidal waveform;
converting, with the converter, the input AC power into converted DC power;
providing the converted DC power to the positive and negative DC busses;
converting, with the inverter, DC power from the positive and negative DC busses into output AC power;
providing the output AC power to the output; and
during switching operation of at least one of the first converter switch and the first inverter switch, clamping a voltage across the at least one of the first converter switch and the first inverter switch to a voltage level of the positive DC bus or the negative DC bus.

16. The method according to claim 15, wherein the first converter switch is coupled to the input and the converter further includes a second converter switch coupled between the first converter switch and the neutral point, wherein clamping the voltage includes, during a positive half cycle of the input sinusoidal waveform and during turn-off of the first converter switch, providing current from the input to a clamp capacitor via a first switching loop to charge the clamp capacitor such that a voltage level across the clamp capacitor is at least equal to the voltage level of the positive DC bus, and wherein clamping the voltage further includes, during a negative half cycle of the input sinusoidal waveform and during turn-off of the second converter switch, providing current from the neutral point to the clamp capacitor via a second switching loop to charge the clamp capacitor such that the voltage level across the clamp capacitor is at least equal to the voltage level of the negative DC bus.

17. The method of claim 16, further comprising during turn-on of the the first converter switch or the second converter switch, discharging the clamp capacitor to the positive DC bus.

18. The method according to claim 15, wherein the first inverter switch is coupled to the output and the inverter further includes a second inverter switch coupled between the first inverter switch and the neutral point, wherein clamping the voltage includes, during a positive half cycle of the output sinusoidal waveform and during turn-off of the first inverter switch, providing current from the output to the clamp capacitor via a first switching loop to charge the clamp capacitor such that a voltage level across the clamp capacitor is at least equal to the voltage level of the positive DC bus, and wherein clamping the voltage further includes, during a negative half cycle of the output sinusoidal waveform and during turn-off of the second inverter switch, providing current from the neutral point to the clamp capacitor via a second switching loop to charge the clamp capacitor such that a voltage level across the clamp capacitor is at least equal to the voltage level of the negative DC bus.

19. The method according to claim 18, further comprising, upon initial-turn on of the inverter, transmitting a plurality of gate pulses to the inverter to limit the current provided from the output to the clamp capacitor via the first switching loop.

20. A power supply system comprising:
an input configured to receive input AC power from an input power source, the input AC power including an input sinusoidal waveform;
an output configured to provide output AC power to a load, the output AC power including an output sinusoidal waveform;
a neutral point;
a converter coupled to the input and configured to convert the input AC power into converted DC power, the converter including a converter switch coupled between the input and the neutral point;
a positive DC bus configured to receive the converted DC power;
a negative DC bus configured to receive the converted DC power;
an inverter coupled to the output and configured to convert DC power from the positive and negative DC busses into the output AC power, the inverter including an inverter switch coupled between the neutral point and the output; and
means for reducing voltage overshoot across at least one of the converter switch and the inverter switch by clamping a voltage across the at least one of the converter switch and the inverter switch to a voltage level of the positive DC bus or the negative DC bus during switching operation of the at least one of the converter switch and the inverter switch.

* * * * *